(12) United States Patent
Roth

(10) Patent No.: US 7,637,386 B2
(45) Date of Patent: Dec. 29, 2009

(54) PLASTIC UNDERGROUND TANK

(76) Inventor: Manfred Roth, Steinweg 5, D-35232 Dautphetal (DE)

( * ) Notice: Subject to any disclaimer, the term of this patent is extended or adjusted under 35 U.S.C. 154(b) by 226 days.

(21) Appl. No.: 11/649,730

(22) Filed: Jan. 4, 2007

(65) Prior Publication Data
US 2007/0158351 A1    Jul. 12, 2007

(30) Foreign Application Priority Data
Jan. 6, 2006    (EP)    ................................. 06000238

(51) Int. Cl.
*B65D 1/24* (2006.01)
*B65D 88/76* (2006.01)
*B65D 88/06* (2006.01)

(52) U.S. Cl. .................... 220/567.1; 220/501; 220/555; 220/601

(58) Field of Classification Search .............. 220/567.1, 220/501, 555, 564, 565, 601, 4.13
See application file for complete search history.

(56) References Cited

U.S. PATENT DOCUMENTS

| | | | | |
|---|---|---|---|---|
| 1,715,466 A | * | 6/1929 | Miller | ........................ 52/236.2 |
| 4,946,056 A | * | 8/1990 | Stannard | ...................... 220/584 |
| 6,180,004 B1 | * | 1/2001 | Drewery | .................. 210/221.2 |
| 6,223,929 B1 | * | 5/2001 | Gerhard | ...................... 220/581 |
| 6,280,614 B1 | * | 8/2001 | Berg et al. | ............. 210/170.08 |
| 6,328,890 B1 | * | 12/2001 | Thibault | .................. 210/532.2 |
| 6,725,519 B2 | * | 4/2004 | Krejci | ........................ 29/421.1 |
| 7,195,285 B2 | * | 3/2007 | Rodousakis et al. | ......... 285/305 |

FOREIGN PATENT DOCUMENTS

| | | |
|---|---|---|
| DE | 3833646 | 4/1990 |
| DE | 20105030 | 8/2001 |
| FR | 2715385 | 1/1994 |

\* cited by examiner

*Primary Examiner*—Anthony Stashick
*Assistant Examiner*—Niki M Eloshway
(74) *Attorney, Agent, or Firm*—Andrew Wilford

(57) ABSTRACT

A tank has a pair of elongated, generally parallel, and hollow plastic chambers having longitudinally extending side walls and closed ends, and a transverse plastic connector tube having one end connected to and opening into one of the elongated chambers and an opposite end connected to and opening into the other of the elongated chambers.

14 Claims, 12 Drawing Sheets

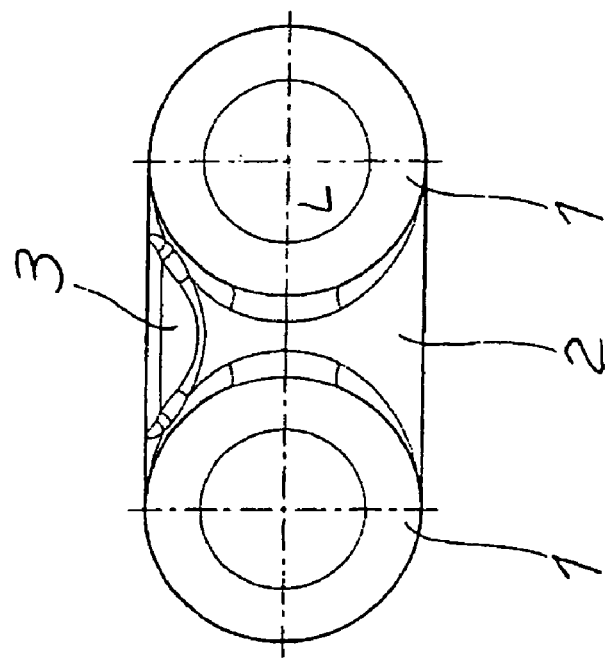
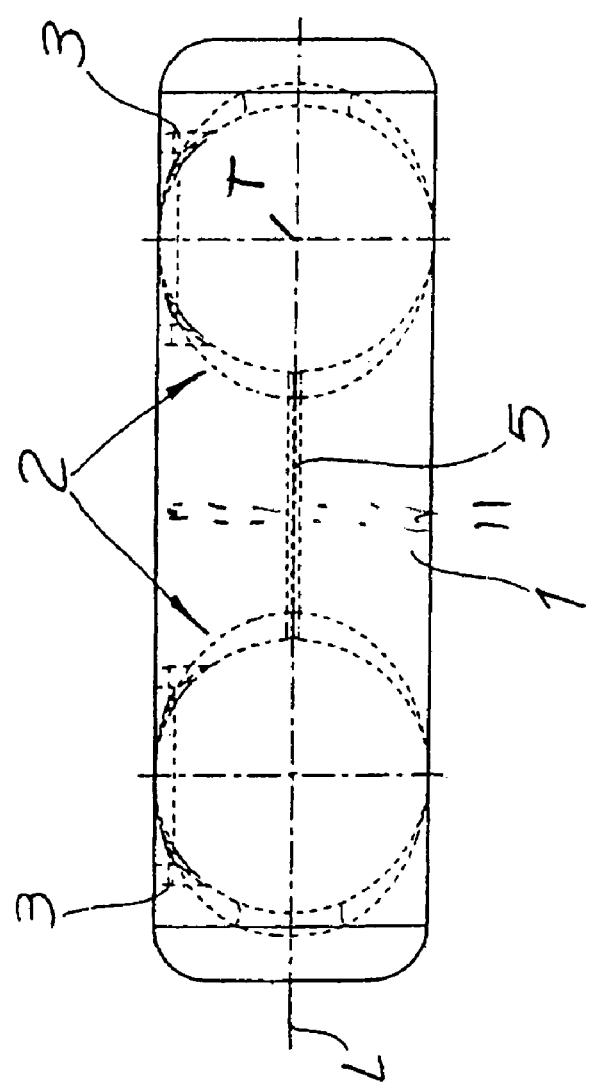

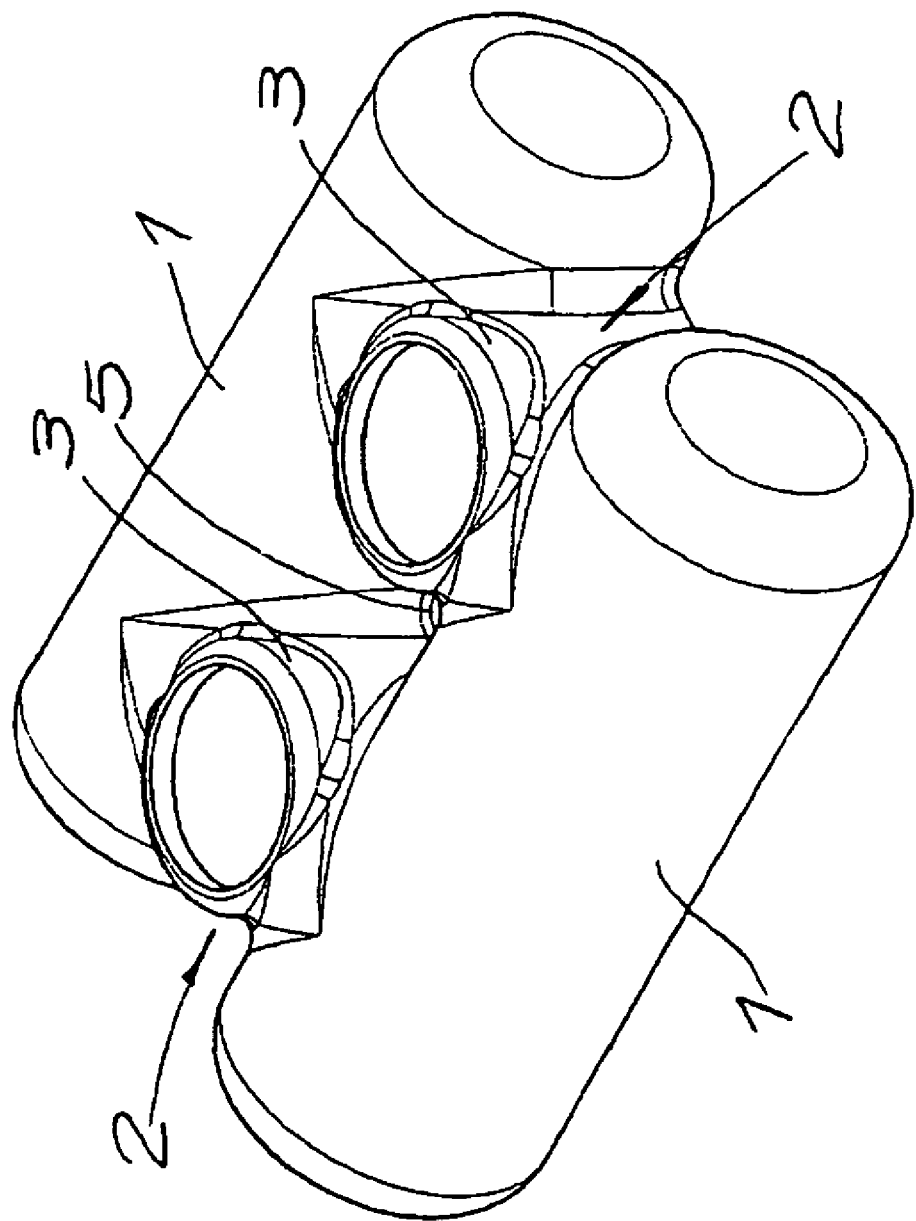

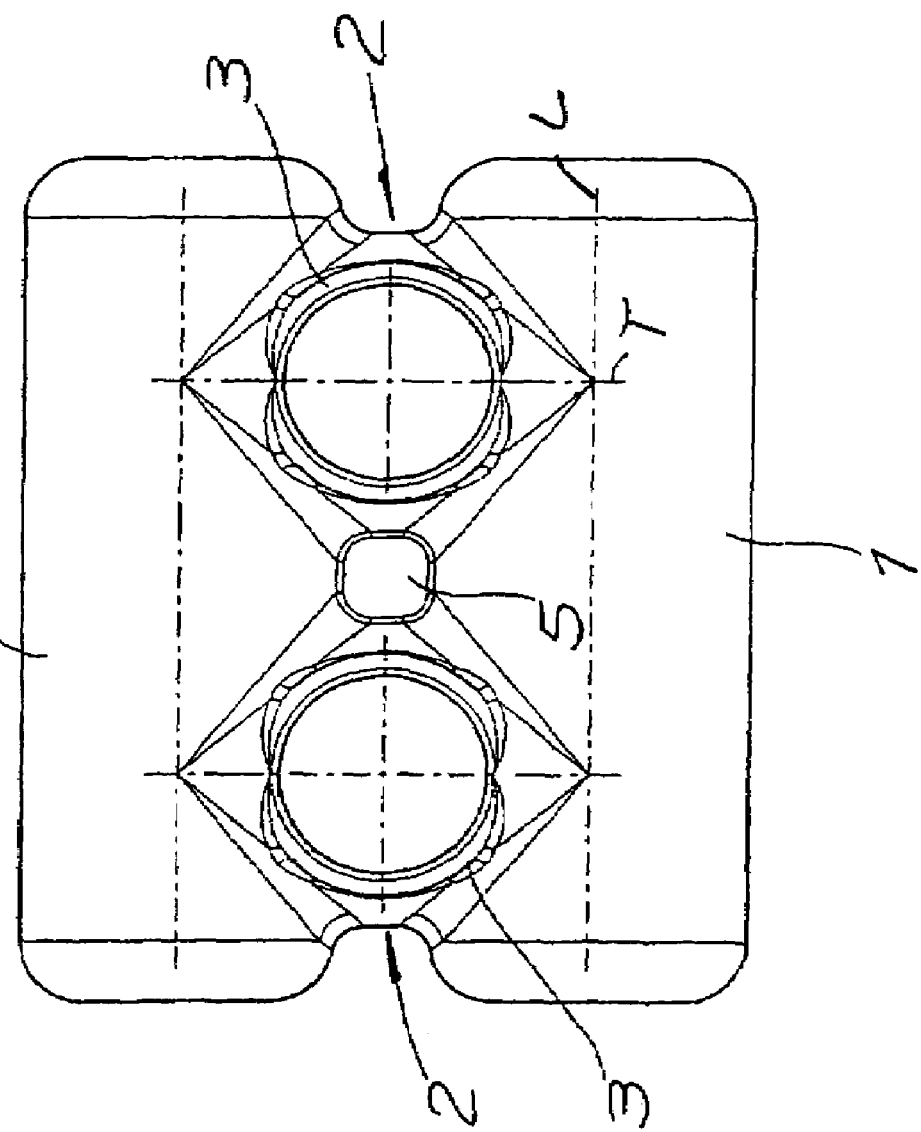

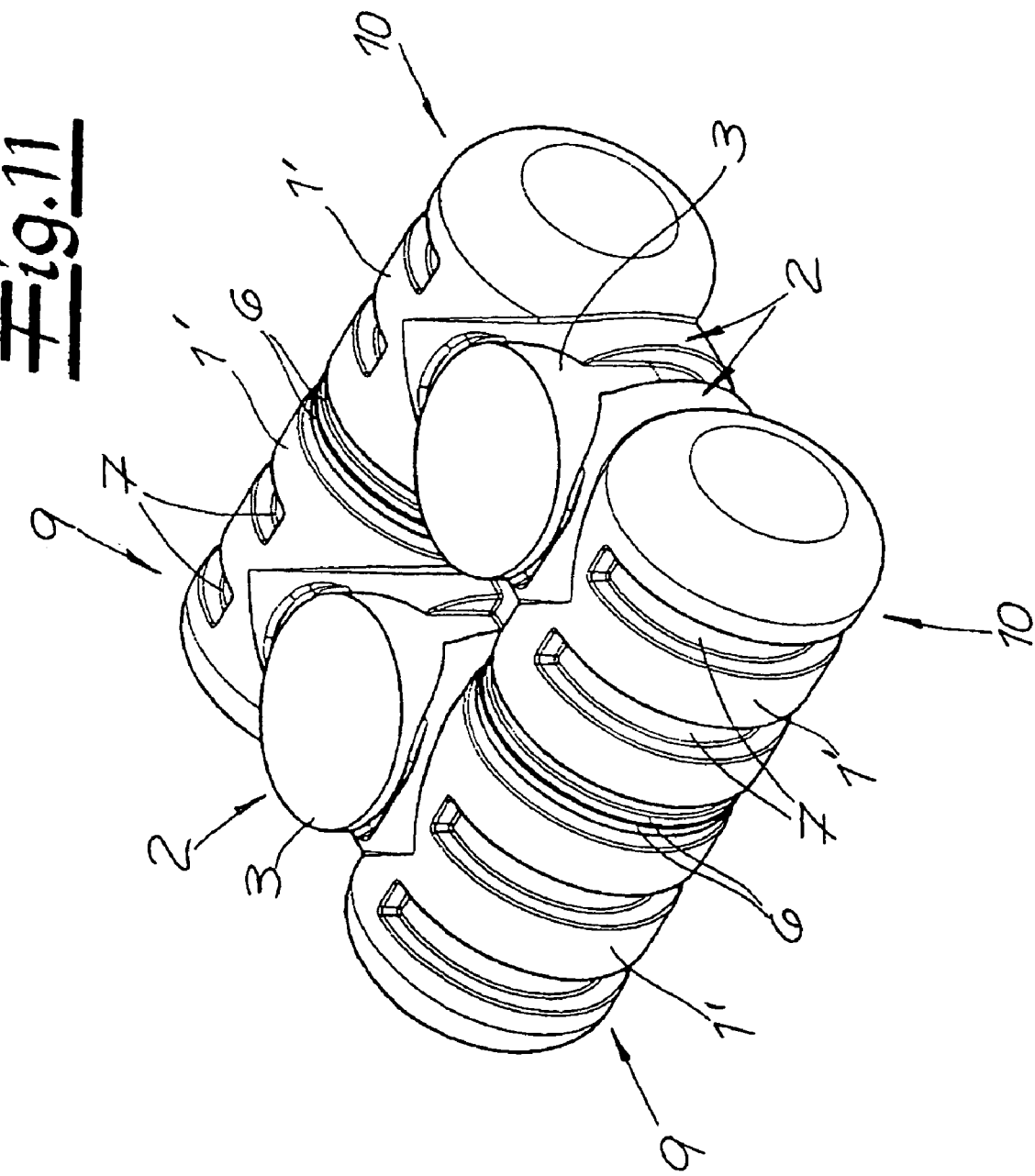

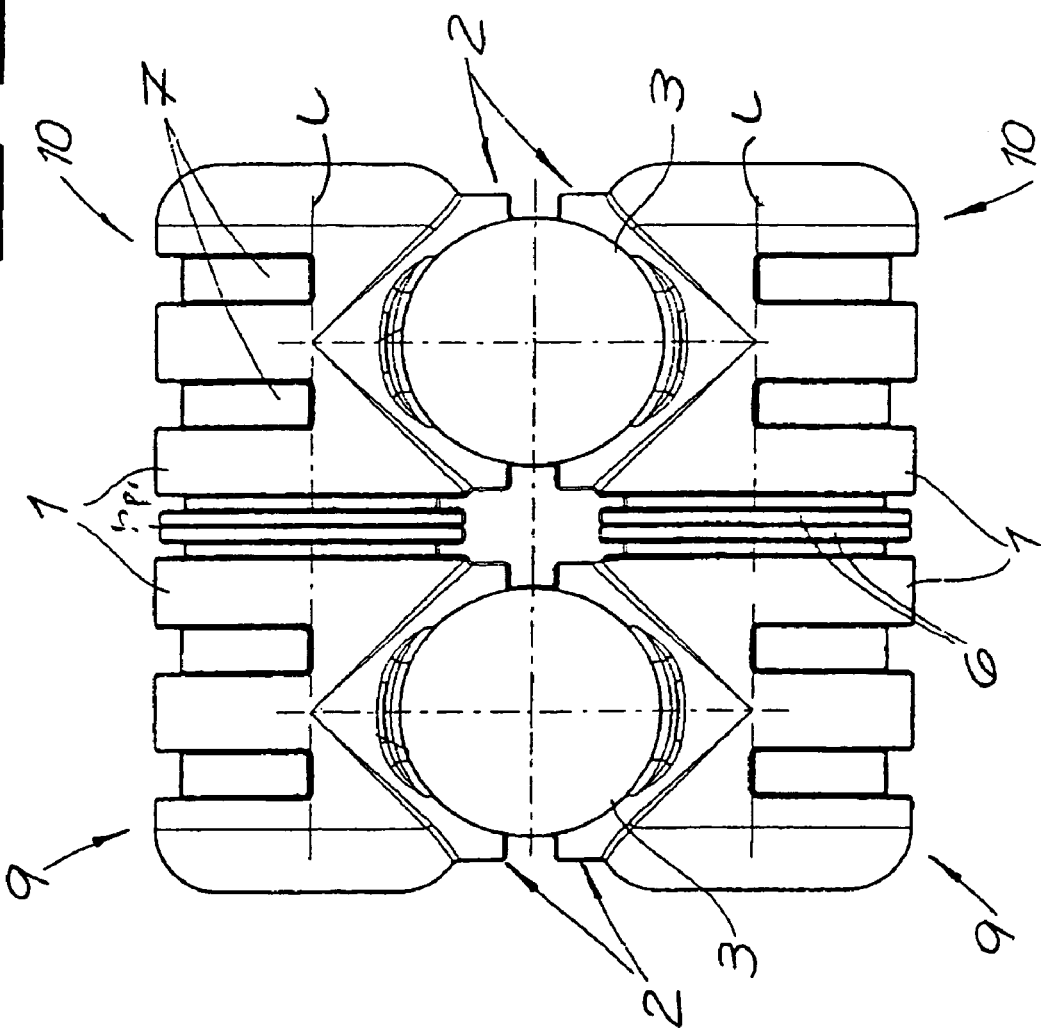

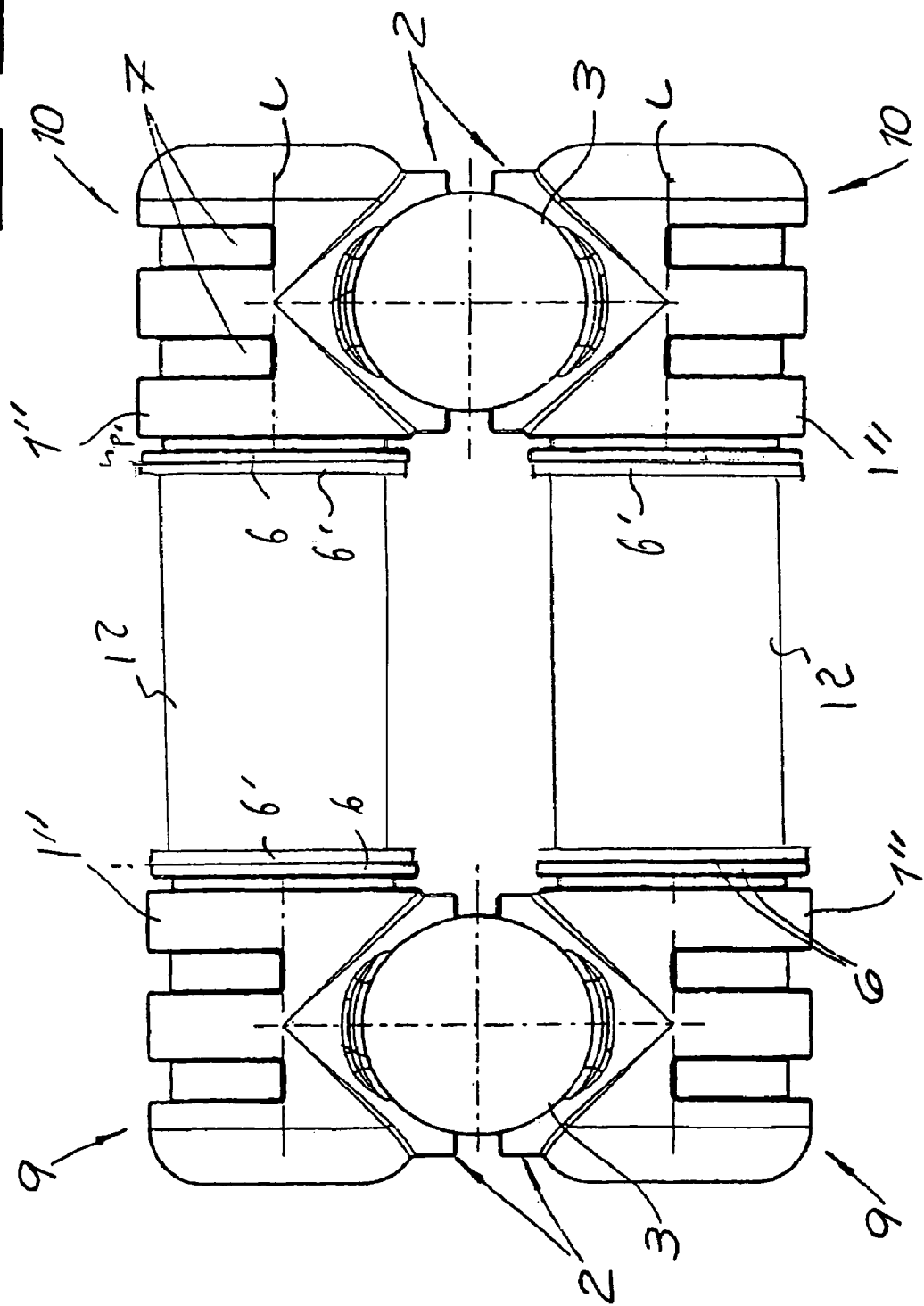

PLASTIC UNDERGROUND TANK

FIELD OF THE INVENTION

The present invention relates to a plastic tank. More particularly this invention concerns such a tank intended to be buried and used for storing water or as a septic holding tank.

BACKGROUND OF THE INVENTION

Water, e.g. from a rainwater-collection system, or sewage is typically held in an underground tank made of plastic. Such a tank is typically made by blow- or spin-molding from polyethylene.

In practice, underground plastic tanks are known in various configurations. These known underground plastic tanks frequently have a cylindrical shape for strength reasons. They must be strong enough to withstand the pressure of the soil on top of and around them. So as to ensure that they can withstand such soil pressure sufficiently, the known underground-plastic tanks often have thick walls.

The underground plastic tanks usually hold volumes of about 3500 liters to about 6000 liters and the most common volume capacities range between 5000 liters and 6000 liters. There are, however, also applications where significantly higher volume capacities are required. The diameter of known cylindrical underground plastic tanks usually ranges up to around 2 m. So as to achieve high stability and strength to resist soil pressure, particularly in the case of high-volume vessels, double-walled tank configurations are known. However, the manufacture of these underground plastic tanks is time-consuming, requires a considerable amount of material and is expensive, and in addition these vessels have the disadvantage of being very heavy.

When cylindrical underground plastic tanks with small cylinder diameters are used, the wall thickness can also be reduced. From practice, for example, an underground plastic tank with a relatively small cylindrical diameter is known, which is shaped as a tube ring. This vessel, however, holds only a relatively small volume. These underground tanks are not suited for larger volumes since the strength and resistance to outside pressure decreases with increasing size and the resultant increasingly large center opening. From practice, furthermore plastic underground tanks are known made up of several small vessels that are connected together to make up the required volume. The production of multipart tanks of this type requires a lot of material and is time-consuming.

OBJECTS OF THE INVENTION

It is therefore an object of the present invention to provide an improved underground plastic tank.

Another object is the provision of such an improved underground plastic tank that overcomes the above-given disadvantages, in particular that can be produced easily, with little complexity and cost-effectively, that can be of single-wall design, and that nevertheless meets the strength requirements and above all also complies with potential regulatory requirements.

The tank according to the invention must furthermore be suitable for use underground both for holding potable or irrigation water or for holding sewage, as in a septic system.

SUMMARY OF THE INVENTION

A tank has according to the invention a pair of elongated, generally parallel, and hollow plastic chambers having longitudinally extending side walls and closed ends, and a transverse plastic connector tube having one end connected to and opening into one of the elongated chambers and an opposite end connected to and opening into the other of the elongated chambers.

According to a preferred embodiment, the plastic tank according to the invention comprises only two longitudinal chambers, although three are a possibility. It is within the scope of the invention that two longitudinal chambers are connected to each other by at least two connector tubes extending transversely to the longitudinal axes of the longitudinal chambers. According to one embodiment, two longitudinal chambers are connected to each other by only two connector tubes.

A longitudinal chamber as defined by the invention is a hollow chamber having an interior that can hold water, sewage and the like, formed by a cylindrically tubular side wall and a pair of end caps, all typically molded as a single piece. As part of the invention, the longitudinal chambers extend parallel or substantially parallel to each other. Furthermore, it is within the scope of the invention that the longitudinal chambers are identical or substantially identical and particularly have the same shape and/or the same size. Thus they are of the same volume. The connectors are preferably tubes extending transversely to the longitudinal axes of the longitudinal chambers. The fact that the connector tubes or the transverse chambers extend transversely to the longitudinal axes of the longitudinal chambers should be interpreted particularly such that the connector tubes are normally perpendicular or substantially perpendicularly to the longitudinal axes of the longitudinal chambers. Hence the connector tubes are also connected to the longitudinal chambers at right angles.

In addition, the plastic tank according to the invention has at least one access or filling and draining opening. The plastic tank is preferably made substantially or entirely of at least one polyolefin. It is preferable if the plastic tank is of polyethylene.

A very preferred embodiment of the invention is characterized in that the longitudinal chambers have circular or oval cross-sections. Preferably both longitudinal chambers are a cylindrical or substantially cylindrical shape.

Suitably, the longitudinal chambers transversely to their longitudinal axes have a maximum diameter of no more than 150 cm, particularly of no more than 130 cm, more preferably of no more than 120 cm and most preferably of no more than 110 cm. According to a particularly preferred embodiment of the invention, the longitudinal chambers transversely to their longitudinal axes have a maximum diameter of no more than 100 cm. If the longitudinal chambers have a cylindrical shape, the diameters are the cylinder diameters; if they are of elliptical section they are the major axis. It is part of the invention that the longitudinal/axial length of the longitudinal chambers is more than twice, preferably more than three times and particularly more than four times the length of the connector tubes measure parallel to their transverse axes. The diameters of the connector tubes are suitably no greater than or substantially no greater than the diameters of the longitudinal chambers transversely to the longitudinal-axes thereof. Normally the connector tubes are of generally the same diameters, or slightly less, than the longitudinal chambers.

It is furthermore within the scope of the invention that the longitudinal chambers of the plastic tank according to the invention have a single-wall configuration. Suitably, the connector tubes between the longitudinal chambers also have a single-wall configuration. According to a preferred embodiment, all the parts of the plastic tank according to the invention have single-wall configurations. As was already explained above, by contrast large-volume double-walled tanks are known from the related art that require complex manufacturing methods and additionally are very heavy.

In accordance with the invention the connector tubes just like the longitudinal chambers are hollow cylinders. A particularly preferred embodiment of the invention is characterized in that at least one connector tube is configured as a hollow chamber and that the interior of the connector tube opens into at least one longitudinal chamber. In other word, according to this embodiment, the interior of the connector tube opens into the interior of at least one longitudinal chamber. It is preferable if the connector tubes are configured as hollow chambers. Suitably, a connector tube configured as a hollow chamber is connected to both adjoining longitudinal chambers or to the interior spaces of both adjoining longitudinal chambers. It has already been pointed out that according to a particularly preferred embodiment, all hollow chambers of the plastic tank according to the invention have a single-wall design. The plastic tank according to the invention nevertheless holds a relatively high volume of particularly more than 3000 liters. The volume relates to the entire volumetric capacity of all the interior spaces, both of the longitudinal chambers and connector tubes of the plastic tank according to the invention. It is preferable if the plastic tank according to the invention holds a volume of at least 3500 liters and is characterized by high strength with regard to pressure, particularly that of the soil it is buried in.

A preferred embodiment of the invention is characterized in that a dome-shaped opening or access hole is provided on at least one connector tube, typically formed as an upwardly open cylindrical collar provided with a removable cap forming a manhole. In this case, of course, the connector tube is hollow. If a connector tube is provided with such an aces is hole, the connector tube, in relation to the installation position of the plastic tank according to the invention, is preferably configured in some regions as an upstanding cylindrical collar with transition radii integrally formed to the adjoining longitudinal chambers.

A preferred embodiment of the invention is characterized in that between the longitudinal chambers at least one connecting element or web is provided, which also connects the connector tubes to each other. The connecting web is preferably connected flush to the longitudinal chambers and is preferably also connected flush to the connector tubes. According to a preferred embodiment, the connecting element is of double-wall design. Such a connecting web contributes to the increased rigidity of the plastic tank according to the invention. The connecting element is suitably a plastic plate that is connected to both the longitudinal chambers and the connector tubes. According to a preferred embodiment of the invention, an interposed plastic plate is disposed at the height of the center longitudinal axes of the longitudinal chambers between the longitudinal chambers. The plastic plate is preferably connected flush to the longitudinal chambers and/or the connector tubes.

According to one embodiment of the invention, the plastic tank according to the invention is produced using a spin molding method. According to a further embodiment of the invention, the plastic tank according to the invention can be produced using a blow-molding method. The latter method is recommended above all for higher volumetric capacities.

The object of the invention is furthermore a method for producing a plastic tank, wherein initially a first, smaller plastic tank is produced in one operation and subsequently the two longitudinal chambers of the smaller plastic tank are severed transversely, prefabricated longitudinal chamber sections are inserted between the longitudinal chamber halves resulting from the transverse separation and are connected to the longitudinal chamber halves, thus creating a second, larger plastic tank. The first, smaller plastic tank can be produced using a blow-molding method or a spin molding method. Then the transverse separation of the small vessel unit is performed, and by connecting the severed vessel components to prefabricated longitudinal chamber sections, the vessel is extended in accordance with the desired volume. If the longitudinal chambers of the smaller plastic tank according to a preferred embodiment are connected by a connecting element, this connecting element is also severed transversely when performing the transverse separation of the longitudinal chambers.

According to one embodiment of the invention, integral shapes incorporated in the bottom of the fuel tank are supported by a filler. The filler is preferably Styrofoam. According to a very preferred embodiment, the interior of the plastic tank according to the invention can be divided into separate sections using closed or partially closed separating walls or partitions.

The connector tubes connecting the longitudinal chambers of the plastic tank are preferably configured in cylindrical shapes, at least in some regions. The maximum diameter of the connector tubes (measured in the longitudinal direction of the longitudinal chambers) suitably amounts to no more than 150 cm, particularly no more than 130 cm, preferably no more than 120 cm and particularly preferred no more than 110 cm. According to a particularly preferred embodiment, the maximum diameter of the connector tubes (measured in the longitudinal direction of the longitudinal chambers) is no more than 100 cm. Suitably, the diameter of the connector tubes corresponds at least substantially to the diameter of the longitudinal chambers transversely to the longitudinal direction thereof.

The underground plastic tank according to the invention has surprisingly high stability toward pressure and/or surprisingly high stability toward soil pressure, even when of large volume. In other words, an underground tank according to the invention is characterized by high stability toward soil pressure, despite the fact that it is made of plastic and does not have the disadvantages known from the prior art described above. The plastic tank according to the invention complies with statutory requirements, for example when used as a collection vessel for sewage. It must be emphasized that the excellent stability toward pressure and/or stability toward soil pressure exists although the tank or underground tank according to a particularly preferred embodiment of the invention is of a single-wall design. For this reason, compared to the double-walled vessels known from the related art, the tank according to the invention also has an advantageously low weight. It can be produced cost-effectively both using a blow-molding method or using a spin-molding method. It is particularly significant that, despite relatively high volume capacity, the plastic tank according to the invention may have a relatively low height in the installed state due to the breakdown into at least two longitudinal chambers according to the invention. As a result, for installation as an underground tank the required depth of the pit is relatively shallow and for this reason installation is relatively inexpensive since deeper pits are clearly more expensive than comparable flat pits in terms of the excavation volume required. In other words, only a shallow pit is required for an underground tank according to the invention, which pit compared to the measures known from the related art allows clearly cost-saving excavation measures. Particularly advantageous are plastic tanks according to the invention, the longitudinal chambers of which or the cylindrical longitudinal chambers of which have a maximum diameter of 100 cm. The plastic tanks according to the invention can also be transported in a particularly space-saving manner, for example on trucks, railway cars or in containers. The plastic tank according to the invention can, of course, also be set up above ground, either individually or stacked. The individual tanks can also be connected to each other.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 2, 3, and 4 are top, side, and end views of the first tank;

FIG. 5 is a perspective view of a second plastic tank according to the invention;

FIG. 6 is a top view of the second tank;

FIG. 11 is a perspective view of a fourth plastic tank according to the invention;

FIGS. 12, 13, and 14 are top, side, and end views of is the fourth tank; and

FIG. 15 is a view like FIG. 12 showing an extended version of the fourth tank.

SPECIFIC DESCRIPTION

As seen in FIGS. 1-4 a plastic tank according to the invention that is used underground for storing water or for holding sewage or the like. The underground plastic tank comprises two spaced longitudinally extending chambers 1, each constituted of a cylindrical side wall and a pair of unitary end caps. The two longitudinal chambers 1 are preferably parallel to each other, and the same size and shape. Preferably, the longitudinal chambers 1 are of circular cross section and are consequently cylindrical, with maximum diameters of 100 cm. The longitudinal chambers 1 therefore have are of relatively short height, and for underground installation of the underground plastic tank according to the invention advantageously only a shallow pit is required. According to the invention the longitudinal chambers 1 are of single-wall design, which advantageously lowers the weight of the underground plastic tank.

In the embodiment according to FIGS. 1 to 6, the longitudinal chambers 1 are connected to each other via two connector tubes extending perpendicular to the longitudinal axes of the longitudinal chambers 1. The connector tubes 2 are preferably configured as hollow transverse chambers, and the interiors of the connector tubes 2 open into the interiors of the two longitudinal chambers 1. The two connector tubes 2 according to FIGS. 1 to 6 and the two outer connector tubes 2 according to FIGS. 7 to 10, are formed with an access hole 3 in the shape of a cylinder centered on a vertical axis. This access hole 3 is connected to the adjoining vessel regions via integrally formed transition radii. This access hole 3 therefore gives access to both of the chambers 1 without weakening them.

In the embodiment according to FIGS. 7 to 10 an additional center connector tube 4 is provided, centered between the end tubes 2. This underground plastic tank according to FIGS. 7 to 10 has a relatively large volumetric capacity and the volume may be 7000 liters in the illustrated embodiment. The underground plastic tank shown in FIGS. 1 to 4, on the other hand, may have a volumetric capacity of 5500 liters. The underground plastic tank according to FIGS. 5 and 6 has a smaller volumetric capacity, for instance 4000 liters. All underground plastic tanks shown have relatively high volumes.

In all variations and according to a very preferred embodiment, the longitudinal chambers 1 are centered on parallel longitudinal axes L and the connector tubes 2 extend along respective transverse axes T perpendicular to and coplanar with the axes L.

Figure 1:
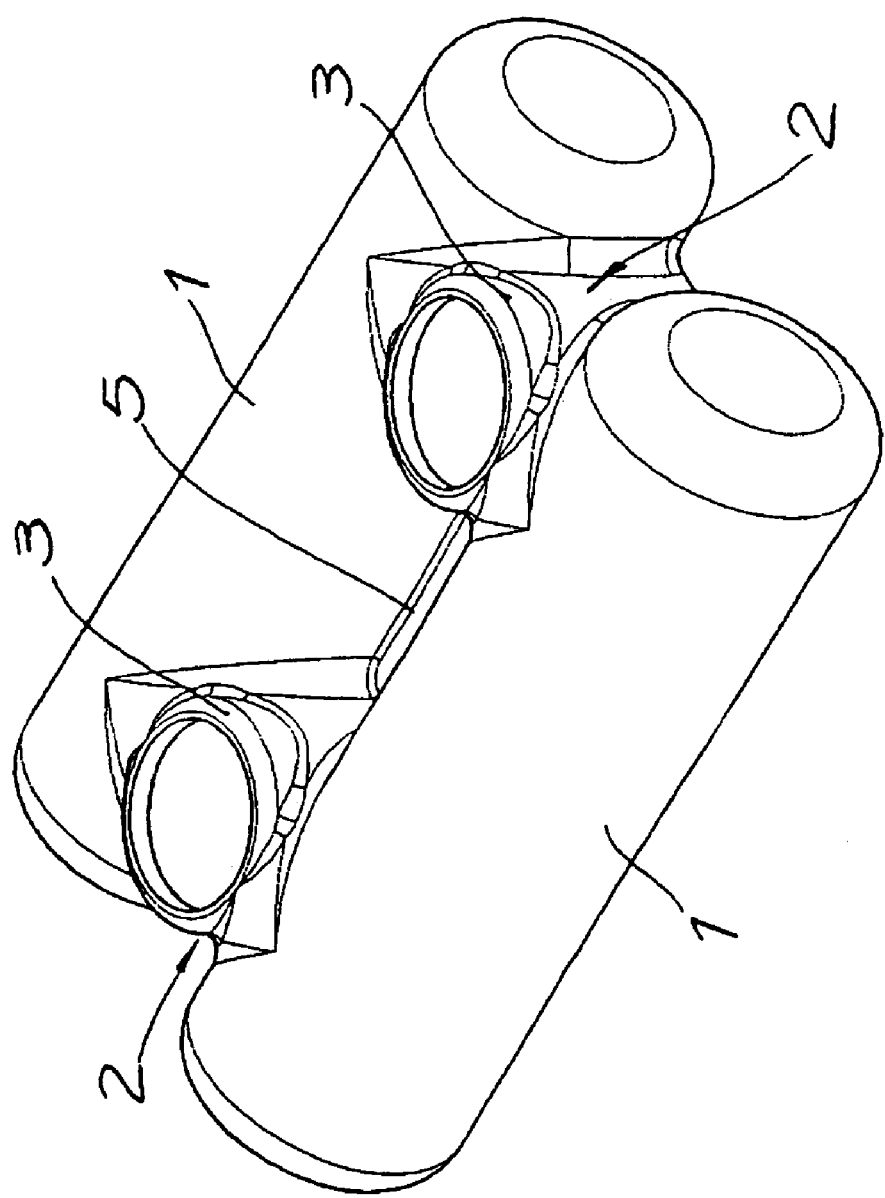
FIG. 1 is a perspective view of a first plastic tank according to the invention.
Figure 2:
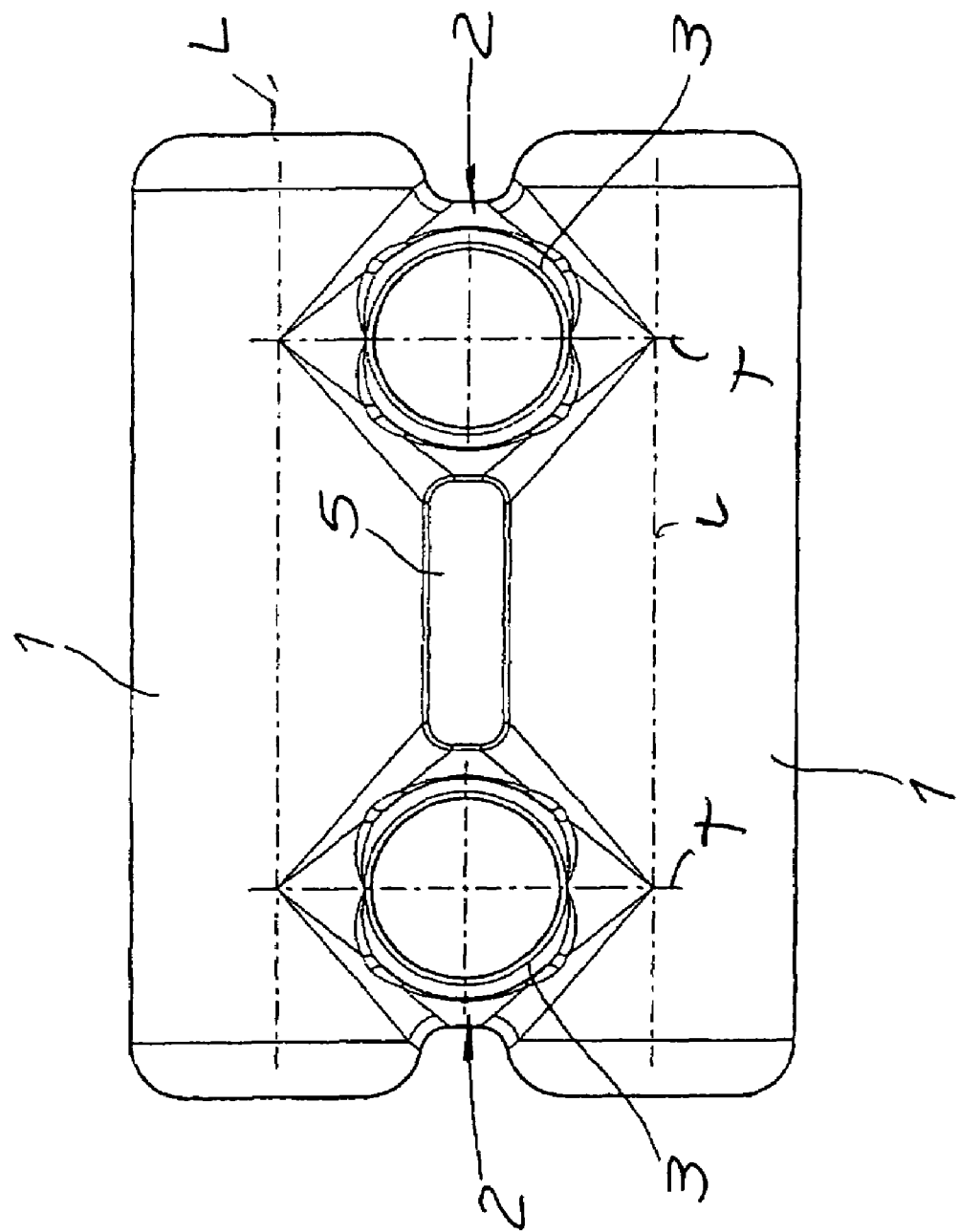
Figure 7:
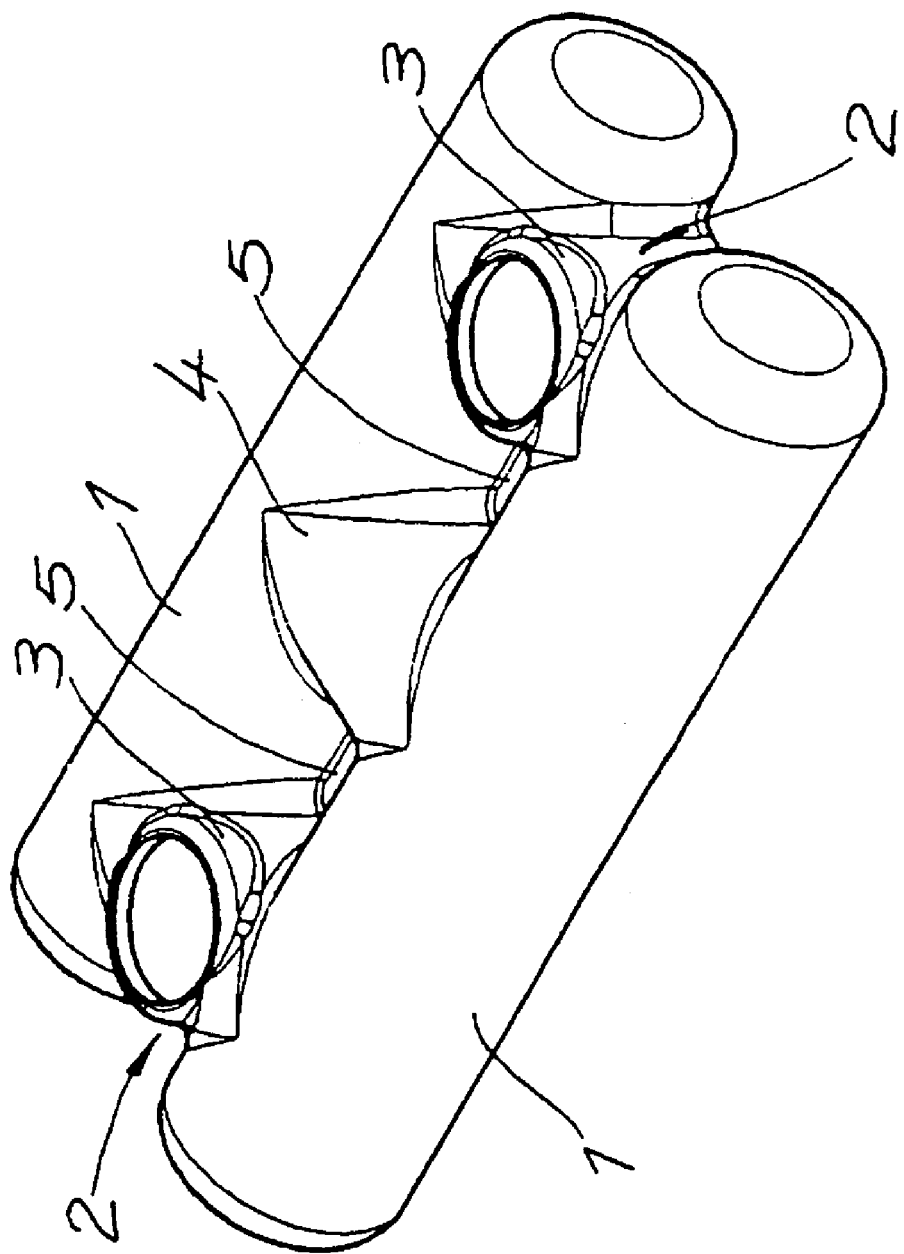
FIG. 7 is a perspective view of a third plastic tank according to the invention.
Figure 8:
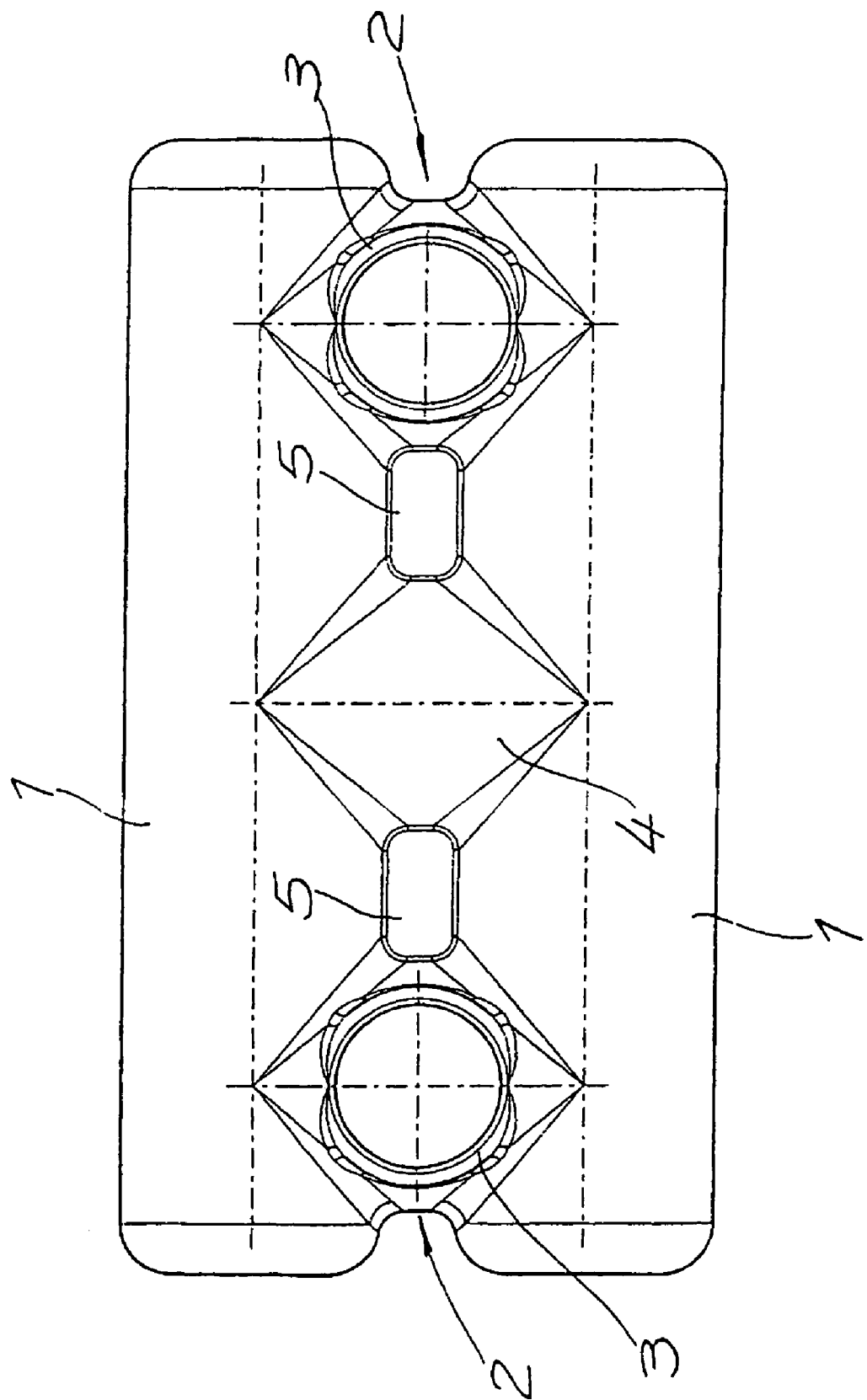
FIGS. 8, 9, and 10 are top, side, and end views of the third tank.
Figure 10:
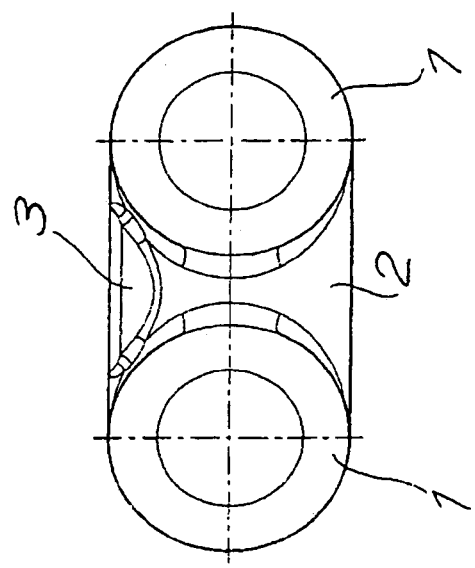
Figure 9:
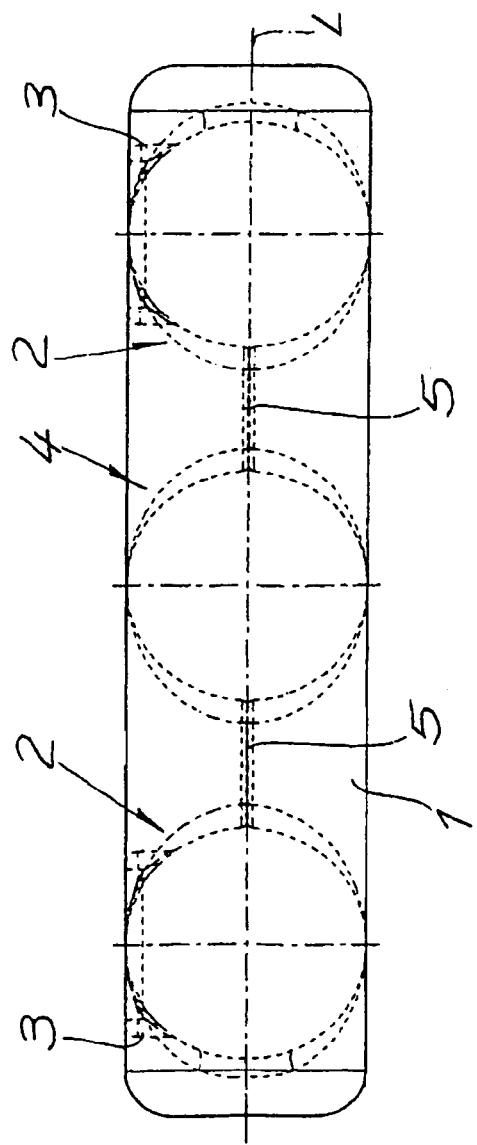
Figure 14:
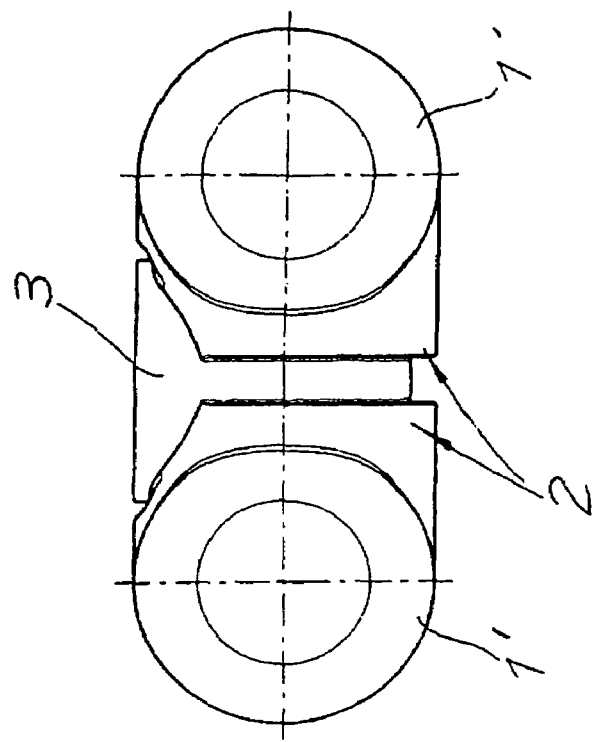
Figure 13:
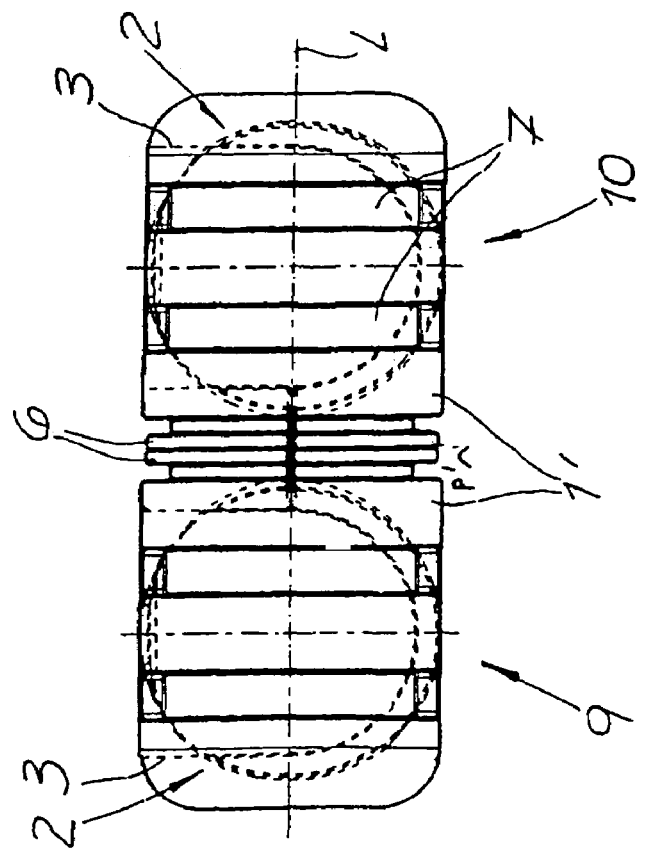

In the illustrated embodiment according to FIGS. 1 to 6, the longitudinal chambers 1 and the two connector tubes 2 are connected to each other by a plastic web or plate 5, (see FIGS. 2 and 6). This plastic web 5 lies preferably in plane including the longitudinal and transverse axes L and T, which plane thus bisects the chambers 1 and tubes 2.

In the illustrated embodiment according to FIGS. 7 to 10, the connector tubes 2 and 4 and the longitudinal chambers 1 are connected to each other by a plastic web or plate 5, respectively. The connection of the plastic plates 5 to the longitudinal chambers 1 and to the connector tubes 2 and 4 is preferably also flush. In this embodiment as well, the plastic plate 5 is disposed at the height of the center longitudinal axes L of the longitudinal chambers 1.

According to a preferred embodiment, the vessel bottom of the underground plastic tank comprises integral shapes incorporated in it, which shapes are not shown and are filled with a prepared filler, particularly with Styrofoam. This way, the stability and/or stability toward soil pressure of the underground plastic tank can be further increased. In addition, is it is part of the invention that the interior of the underground plastic tank is divided into sections by partitions separating walls such as shown in dashed lines at 11 in FIG. 3.

FIGS. 11 to 15 relate to a special embodiment of an underground plastic tank according to the invention and/or to a preferred method for producing an underground plastic tank according to the invention. The unit shown in FIGS. 11 to 14 (first, smaller underground plastic tank) is produced using a blow-molding method. The volume and/or the volumetric capacity of the unit may be 3500 liters in the embodiment. The small vessel unit comprises two longitudinal chambers 1' each centrally formed with a pair of flanges 6 that meet at a plane P'. These separating flange projections 6 are suitable provided in the center of the longitudinal chamber 1 with respect to the longitudinal and horizontal axis L of each longitudinal chamber 1'. The longitudinal chambers 1' of the small vessel unit shown in FIGS. 11 to 14 additionally are formed with integral reinforcement grooves 7 increase the rigidity of the longitudinal chambers 1' and of the underground plastic tank they form with the respective connecting tubes 2.

In order to increase the capacity of the tank having these chambers 1', it is possible as shown in FIG. 15 to separate each of the chambers 1' at the plane P' between the separating flanges 6, producing two tank halves each with two chambers halves 1" and one connecting tube 2. Then, simple open-ended tubes 12 of the same diameter as the chambers 1' and having end flanges 6' identical to the flanges 6 are fitted between the two tank halves to extend its dimension longitudinally. The flanges 6 and 6' are bolted, welded, and or sealed together to produce a large-capacity tank, preferably welded. This work can be done at the factory or even in the field. The capacity of the resultant tank is thus adjustable and can be increased greatly, depending on how many extensions are inserted between the flanges 6.

I claim:

1. A tank comprising:
   a pair of elongated, generally parallel, and hollow plastic chambers having longitudinally extending side walls and closed ends; and
   two transverse plastic connector tubes extending parallel to but at a spacing from each other between the longitudinal chambers and each having one end connected to and opening into one of the elongated chambers and an opposite end connected to and opening into the other of the elongated chambers; and
   a web connected to and extending between the tubes.

2. The tank defined in claim 1 wherein the chambers are of round cross-sectional shape.

3. The tank defined in claim 2 wherein the tubes are of round cross-sectional shape.

4. The tank defined in claim 2 wherein the chambers are generally cylindrical and have a diameter of at most 150 cm.

5. The tank defined in claim 1 wherein the walls and ends of the chambers are of single thickness.

6. The tank defined in claim 1 wherein the chambers and the tubes are of generally the same cross-sectional size.

7. The tank defined in claim 6 wherein each tube is formed with an upwardly open access hole.

8. The tank defined in claim 1 wherein the web is also connected to and extends between the chambers.

9. The tank defined in claim 8 wherein the web is a planar plastic plate integrally joined to the tubes and chambers.

10. The tank defined in claim 9 wherein the web lies in a plane including center axes of the chambers and tubes.

11. The tank defined in claim 1 wherein each of the longitudinal chambers is formed by a pair of substantially identical end sections each connected via a respective such tube connector to another such end section, and a central extension tube fixed between the end sections.

12. The tank defined in claim 11 wherein each of the end sections has a flange and each of the tube sections has a flange fixed to a respective one of the end-section flanges.

13. The tank defined in claim 12 wherein the end sections and central extension tube are cylindrical and of generally the same diameter.

14. The tank defined in claim 1 wherein the longitudinal chambers are centered on horizontal longitudinal axes.

\* \* \* \* \*